(12) United States Patent
Miyawaki (10) Patent No.: US 8,704,912 B2
(45) Date of Patent: Apr. 22, 2014

(54) APPARATUS AND METHOD FOR COMPRESSIVE SAMPLING

(75) Inventor: Mamoru Miyawaki, Tuscon, AZ (US)

(73) Assignee: Canon Kabushiki Kaisha, Tokyo (JP)

( * ) Notice: Subject to any disclaimer, the term of this patent is extended or adjusted under 35 U.S.C. 154(b) by 114 days.

(21) Appl. No.: 13/355,181

(22) Filed: Jan. 20, 2012

(65) Prior Publication Data

US 2012/0188433 A1 Jul. 26, 2012

Related U.S. Application Data

(60) Provisional application No. 61/434,795, filed on Jan. 20, 2011.

(51) Int. Cl.
*H04N 5/228* (2006.01)
*H04N 5/225* (2006.01)

(52) U.S. Cl.
USPC ............. 348/230.1; 348/222.1; 348/335; 348/340; 348/343; 348/344; 348/220.1

(58) Field of Classification Search
USPC ........... 348/340, 335, 222.1, 230.1, 343, 344, 348/333.1
See application file for complete search history.

(56) References Cited

U.S. PATENT DOCUMENTS

| | | | | |
|---|---|---|---|---|
| 7,532,772 B2 * | 5/2009 | Brady | | 382/299 |
| 8,472,735 B2 * | 6/2013 | Lane et al. | | 382/235 |
| 2003/0107671 A1 * | 6/2003 | Castro et al. | | 348/395.1 |
| 2006/0239336 A1 * | 10/2006 | Baraniuk et al. | | 375/216 |
| 2007/0092149 A1 * | 4/2007 | Sung | | 382/239 |
| 2008/0187047 A1 * | 8/2008 | Stephan et al. | | 375/240.16 |
| 2010/0053352 A1 * | 3/2010 | Dekel | | 348/222.1 |
| 2010/0092044 A1 * | 4/2010 | Chen et al. | | 382/107 |

FOREIGN PATENT DOCUMENTS

JP 2002369206 A * 12/2002 ............... H04N 7/32

OTHER PUBLICATIONS

Takhar, Dharmpal, et al., "A New Compressive Imaging Camera Architecture using Optical-Domain Compression", Proc. SPIE 6065, Computational Imaging IV, Feb. 2, 2006, pp. 606509-1-606509-10, vol. 6065, (<http://proceedings.spiedigitallibrary.org/proceeding.aspx?articleid=728899> ).

* cited by examiner

*Primary Examiner* — Nhan T Tran
*Assistant Examiner* — Xi Wang
(74) *Attorney, Agent, or Firm* — Canon USA Inc. IP Division (57) ABSTRACT

A method for a compressive sampling to capture an image of the object by using a spatial light modulator and a photo-detector, the method includes driving the spatial light modulator in a first rough sampling mode which is executed by using first coded patterns; detecting signals from the photo-detector to obtain a first data at t=t1; detecting signals from the photo-detector to obtain a second data at t=t2, where t2>t1; and changing the first rough sampling mode to a second rough sampling mode which is executed by using second coded patterns finer than the first coded patterns when a difference between the first data and the second data is greater than a threshold value.

19 Claims, 12 Drawing Sheets

APPARATUS AND METHOD FOR COMPRESSIVE SAMPLING

CROSS REFERENCE TO RELATED APPLICATION

This application claims priority to U.S. provisional application No. 61/434,795 filed Jan. 20, 2011 entitled APPARATUS AND METHOD FOR COMPRESSIVE SAMPLING. The whole of the provisional application is incorporated by reference herein.

BACKGROUND OF THE INVENTION

1. Field of the Invention

The present invention relates to an apparatus and a method for a compressive sampling.

2. Description of the Related Art

A volume of data to be stored in a storage medium easily becomes very large even if a method of compressive sampling is used.

SUMMARY OF THE INVENTION

Embodiments of the present invention provide an apparatus and a method for a compressive sampling.

According to an aspect of the present invention, a method for a compressive sampling is used to capture an image of the object by using a spatial light modulator and a photo-detector. The method includes driving the spatial light modulator in a first rough sampling mode which is executed by using first coded pattern; detecting signals from the photo-detector to obtain a first data at t=t1; detecting signals from the photo-detector to obtain a second data at t=t2 (>t1); and changing the first rough sampling mode to a second rough sampling mode which is executed by using second coded pattern finer than the first coded pattern, when a difference between the first data and the second data is greater than a threshold value.

According to another aspect of the present invention, an apparatus includes an image lens, a spatial light modulator for a compressing sampling, a driver unit configured to drive the spatial light modulator in a first rough sampling mode which is executed by using first coded patterns, and a photo-detector to detect signals to obtain a first data at t=t1 and a second data at t=t2 (>t1). The driver unit changes the first rough sampling mode to a second rough sampling mode which is executed by using second coded patterns finer than the first coded patterns, when a difference between the first data and the second data is greater than a threshold value.

Further features of the present invention will become apparent from the following description of exemplary embodiments with reference to the attached drawings.

DESCRIPTION OF THE EMBODIMENTS

Embodiments according to the present invention will be described below with reference to the attached drawings.

Embodiment 1

Adaptive Compressive Sampling

Figure 1:
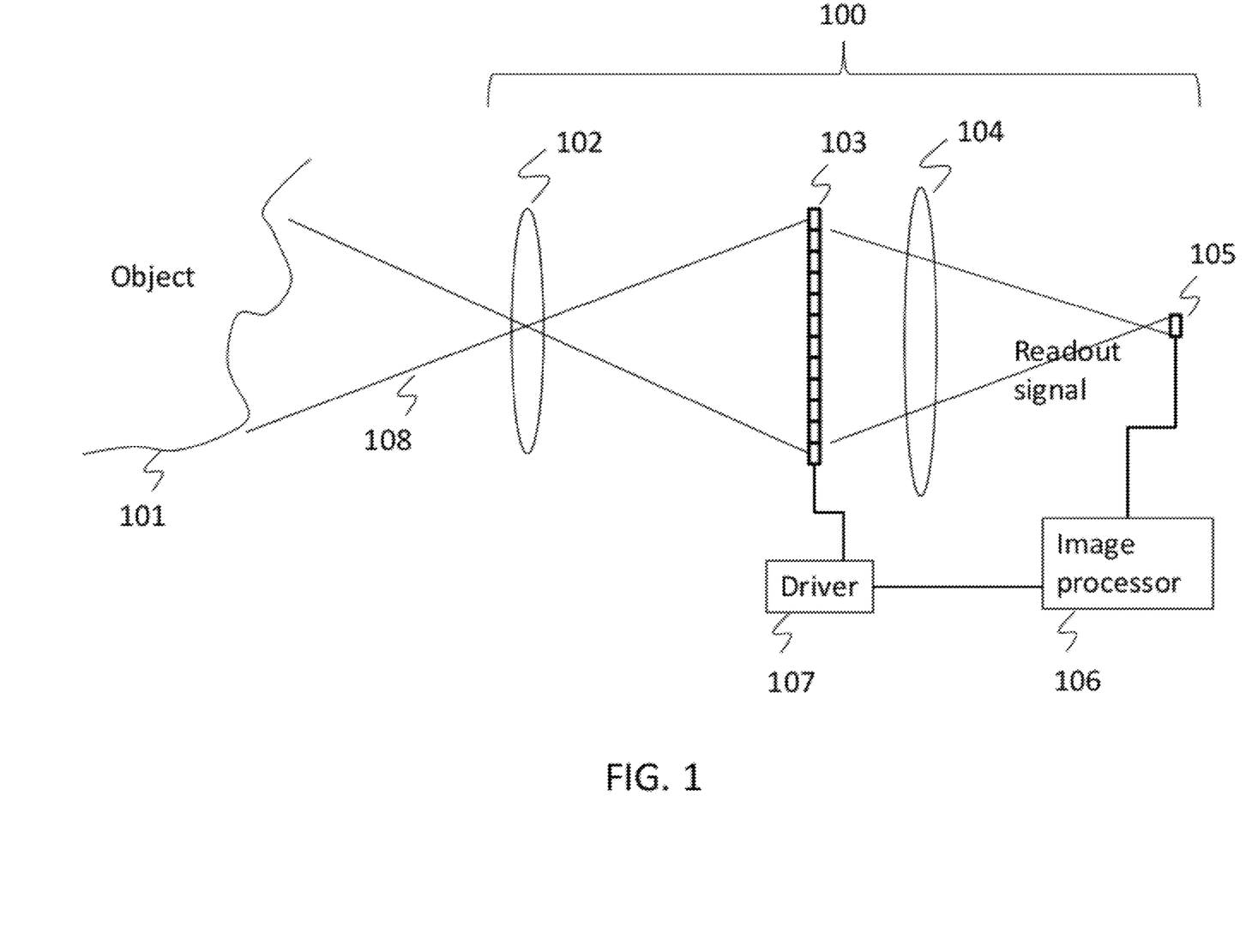
FIG. 1 illustrates a unit for a compressive sampling.

FIG. 1 illustrates a unit 100 used for a compressive sampling. The unit 100 can be installed in an imaging device, e.g., a camera or a camcorder. An image of an object 101 can be detected by a photo-detector 105 via a first lens 102, a spatial light modulator (SLM) 103, and a second lens 104.

The first lens 102 and the second lens 104 are used as an image lens and a focusing lens, respectively. The SLM 103, which is used for coding, can be controlled by a driver 107. In this unit 100, instead of using an array sensor to detect the image of the object 101, the SLM 103 and a photo-detector 105 are used. A signal detected by the detector 105 will be input into an image processor 106. The driver 107 for the SLM 103 can be controlled by the image processor 106. Light 108 from the object 101 can be detected by the photo-detector 105. The photo-detector 105 can be placed at a focal position. The apparatus can be configured so that SLM 103 is conjugated to the object 101 and the modulated light by SLM is focused on a photo-detector 105. Alternatively, the apparatus can be configured so that SLM 103 is put on the pupil plane and a photo detector 105 is conjugated to the object 101.

Figure 2:
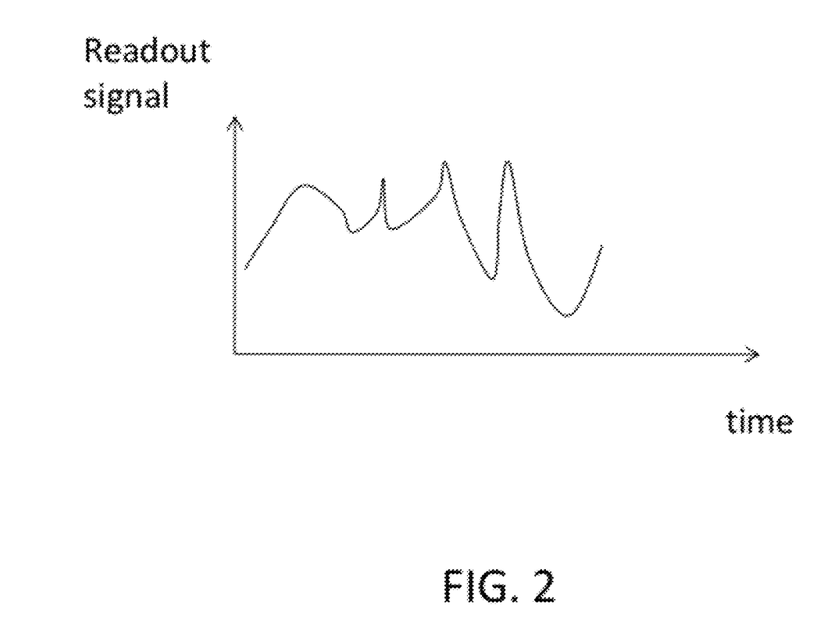
FIG. 2 illustrates a signal from a photo-detector.
Figure 3A:
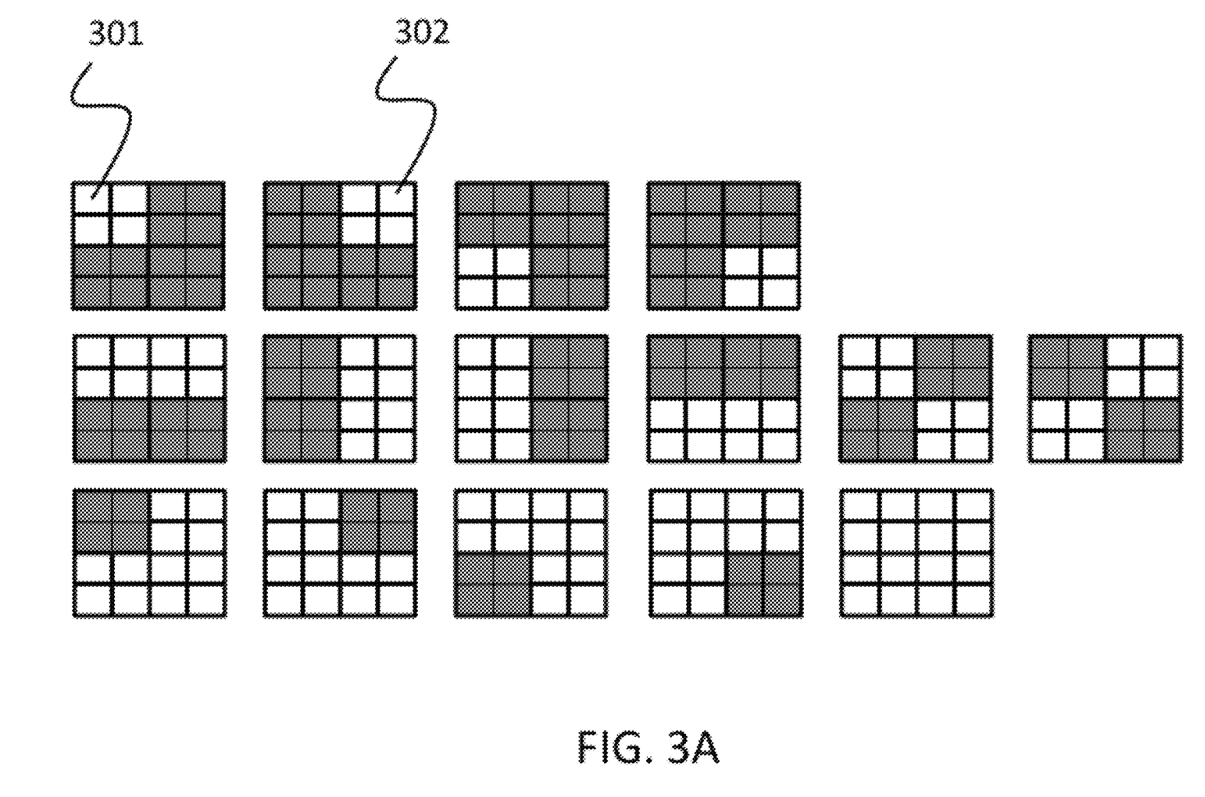
FIG. 3A illustrates coded patterns for the spatial light modulator.
Figure 3B:
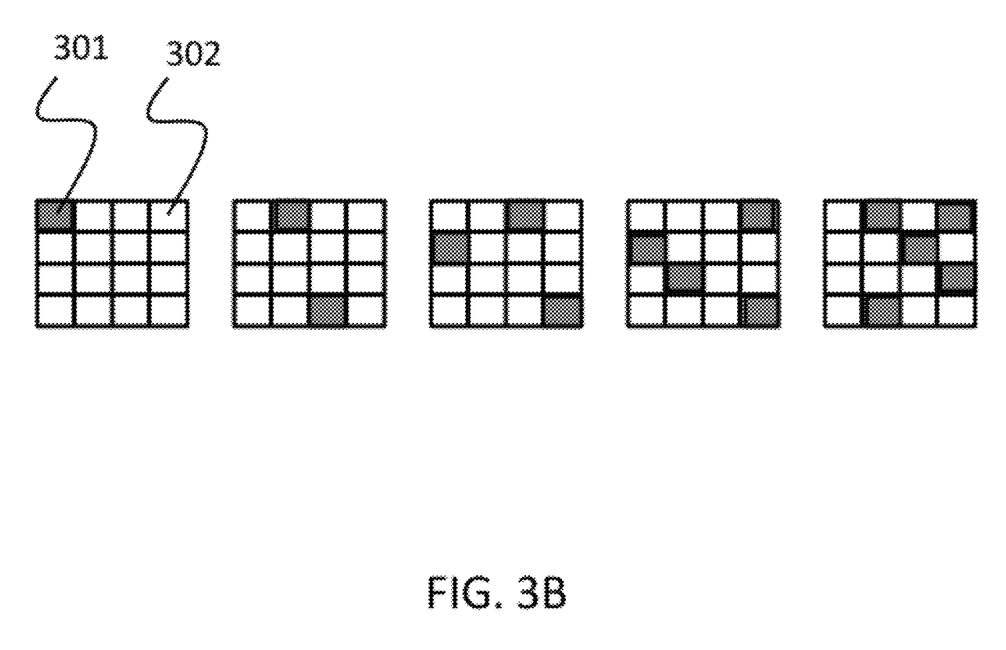
FIG. 3B illustrates coded patterns for the spatial light modulator.

A signal from the photo-detector 105 can be detected as illustrated in FIG. 2. By using the signal from the photo-detector 105 and the coding information of the SLM 103, the image of the object 101 can be reconstructed. The coding information, when the SLM 103 is a 4*4 light modulator, is exemplary illustrated in FIGS. 3A and 3B. Fifteen kinds of the coding information are illustrated in FIGS. 3A and 3B, and the reference numbers 301 and 302 represent an opened window of the SLM 103 and a closed window of it, respectively.

The SLM 103, for example, can be selected from a digital micro-mirror device (DMD), a transmission type LCD, or reflection type LCD called LCOS. AS to a compressive sampling system with the DMD and a single detection element is described in U.S. Patent Application Publication No. 2006/0239336, published on Oct. 26, 2006 (Richard et al.), which is hereby incorporated by reference in its entirety as though fully and completely set forth herein.

In this embodiment, the unit 100 includes at least two kinds of coded pattern groups in one sampling mode. One of the groups is rough coded patterns as illustrated in FIG. 3A, and the other is fine coded pattern series as illustrated in FIG. 3B. In FIG. 3B, some, but not all, of the coded patterns are shown. Hereinafter, when the rough coded patterns are used for coding, the type of the sampling is referred to as "rough sampling", and when the fine coded patterns are used for coding, the type of the sampling is referred to as "fine sampling". The image processor 106 in FIG. 1 may compare data, which is obtained as a sequential output as illustrated in FIG. 2, between two rough samplings or between a rough sampling and a fine sampling. The image processor 106 might compare two images reconstructed by using data obtained through the photo-detector 105. One image can be formed by the rough sampling and the other image can be formed by the fine sampling (or a second rough sampling). The image processor 106 may instruct the driver 107 based on the result of the comparison. The data obtained by the photo-detector 105 may include depth information of the object 101, and the image processor 106 may reconstruct the three dimensional image of the object by using the depth information.

Figure 4:
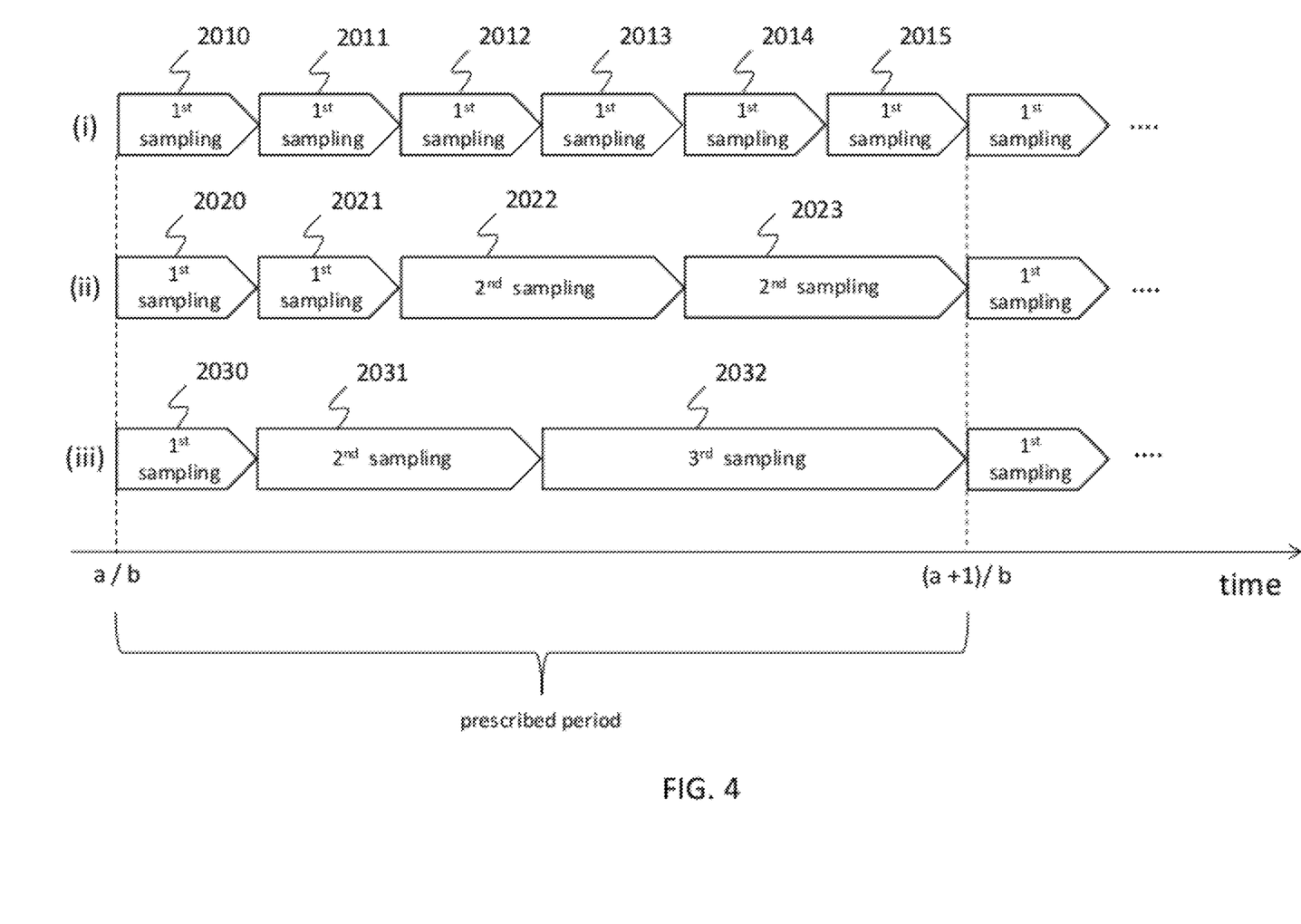
FIG. 4 illustrates changes of the sampling modes.

FIG. 4 illustrates changes in sampling modes. When the object 101 to be observed by the unit 100 is static and does not include many areas with a high spatial frequency, it may be sufficient to store the image data obtained by the rough sampling instead of the image data obtained by the fine sampling.

To reduce the volume of the data to be stored in a storage medium, when the object to be observed by the unit 100 is static and an image of the object does not include a high spatial frequency, data which is obtained by using the rough sampling will be stored instead of data obtained by using the fine sampling. On the other hand, when the object to be observed by the unit is not static or an image of the object includes a high spatial frequency, data obtained by using the fine sampling can be stored instead of data which is obtained by using the rough sampling.

When the unit 100 can execute a first, second, and third sampling modes, each sampling mode is explained as follows.

The first sampling mode can execute rough samplings twice by using the coded patterns of $P_{r\_1}$ and a fine sampling once by using the coded patterns of $P_{f\_1}$, which is finer than the coded patterns of $P_{r\_1}$.

The second sampling mode can execute rough samplings twice by using the coded patterns of $P_{r\_2}$, which is finer than the coded patterns of $P_{r\_1}$, and one fine sampling by using the coded patterns of $P_{f\_2}$, which is finer than the coded patterns of $P_{r\_2}$. The data volume obtained by the second sampling mode is larger than the data volume obtained by the first sampling mode.

The third sampling mode can execute rough samplings twice by using the coded patterns of $P_{r\_3}$, which is finer than the coded patterns of $P_{r\_2}$, and a fine sampling once by using the coded patterns of $P_{f\_3}$, which is finer than the coded patterns of $P_{r\_3}$. The data volume obtained by the third sampling mode is larger than the data volume obtained by the second sampling mode.

Each sampling mode can include the rough sampling twice and the fine sampling once. When the second sampling mode has been executed after the first sampling mode in the prescribed period as illustrated in FIG. 4 (types (ii) or (iii)), the second sampling mode will be continuously executed or the third sampling mode will be executed until the end of the prescribed period. In addition to the third sampling mode, a fourth sampling mode or further sampling mode may be used.

In FIG. 4, a type (i) indicates only the first sampling mode (2010 to 2015) is executed repeatedly within a prescribed period (e.g. 1/120 sec). A type (ii) indicates the second sampling mode (2022 and 2023) is executed repeatedly after the first sampling mode 2020 and 2021 within the prescribed period. A type (iii) indicates the first, second, and third sampling modes (2030, 2031, and 2032) are executed one after another.

The unit 100 can be controlled so as to store image data of the object periodically, or in synchronization with a certain signal. In the type (i), the image data obtained by the first sampling mode 2015 can be read out and stored in a memory for forming an image. In the type (ii), image data obtained by the second sampling mode 2023 can be read out and stored in the memory for forming an image. In the type (iii), image data obtained by the third sampling mode 2032 can be read out and stored in the memory for forming an image.

For example, when the object to be observed by the unit 100 is static and does not include many areas with a high spatial frequency, the data volume can be reduced by storing the data obtained by the first sampling mode 2015 instead of the data of the second or third sampling mode (2023 and 2032).

Figure 5:
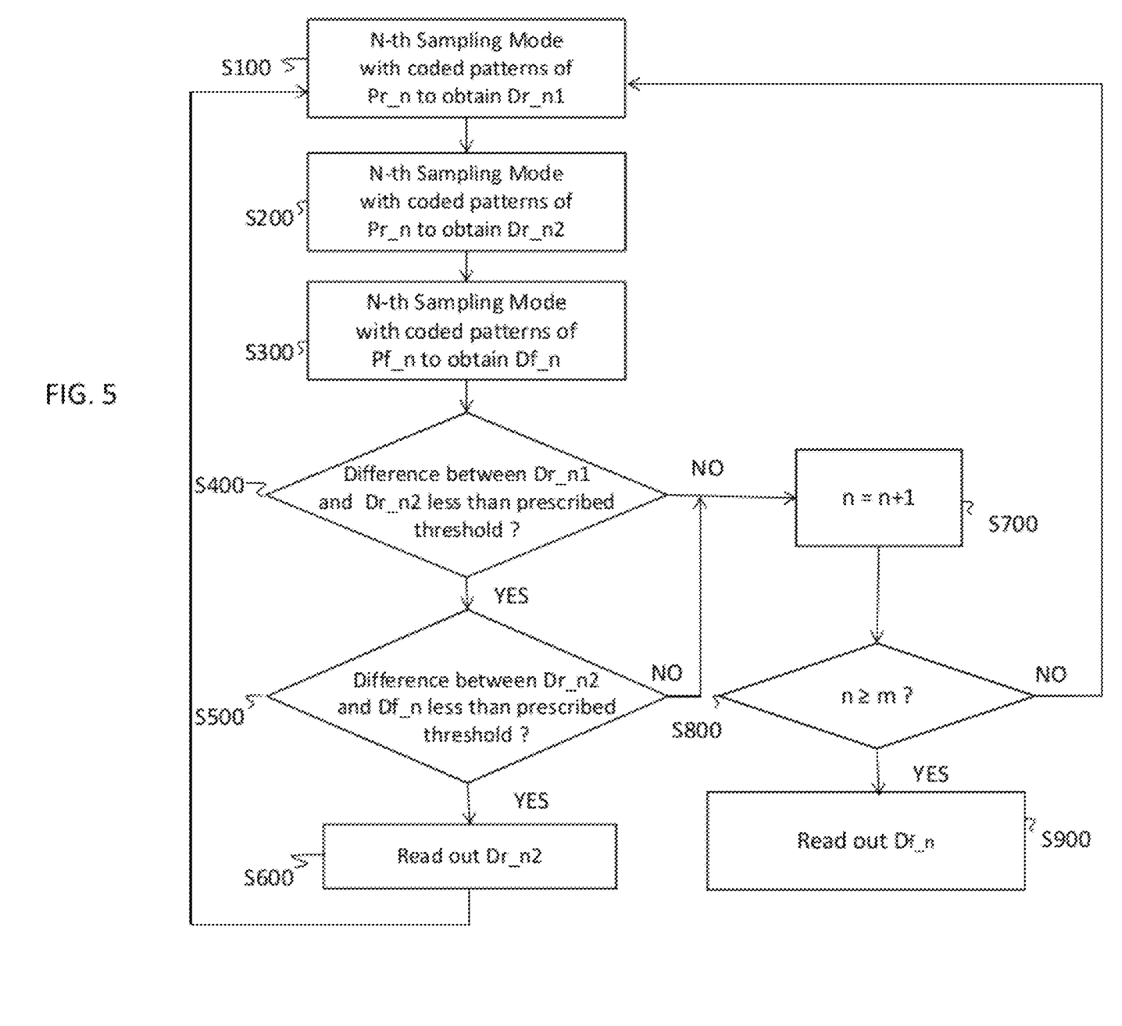
FIG. 5 illustrates a flowchart used for changing the sampling mode.

A flowchart showing a process to change the sampling mode, which may be executed within a prescribed period, is illustrated in FIG. 5.

The value of N can be set to 1 at first, and the value of m can be set to a prescribed value (e.g. m=3).

At step S100, as the N-th sampling mode, data $D_{r\_n1}$ by using the coded patterns of $P_{r\_n}$ can be obtained. At step S200, data $D_{r\_n2}$ by using the coded patterns of $P_{r\_n}$ can be obtained. At step S300, data $D_{f\_n}$ by using the coded patterns of $P_{f\_n}$ can be obtained. The image data can be reconstructed by using the obtained data $D_{r\_n1}$ (or $D_{r\_n2}$ or $D_{f\_n}$) and the information about the coded patterns.

At step S400, it is determined whether the difference between $D_{r\_n2}$ and $D_{r\_n1}$ is zero or less than a specified threshold. When the difference between $D_{r\_n2}$ and $D_{r\_n1}$ is equal to zero or less than a specified threshold ("YES" in step S400), the flow proceeds to step S500. The difference can be related to brightness information at each pixel. At step S500, when the difference between $D_{r\_n2}$ and $D_{f\_n}$ is equal to zero or less than a specified threshold ("YES" in step S500), the flow proceeds to step S600. The order of steps S400 and S500 could be reversed. Step S300 could be performed between steps S400 and S500, instead of between steps S200 and S400. At step S400 or step S500, data obtained at steps S200 and S100 (or S300) themselves can be compared, or the reconstructed images based on the data obtained at steps S200 and S100 (or S300) can be compared.

At step S600, the image data $D_{r\_n2}$ (or $D_{r\_n1}$) will be read out as the result of the N-th sampling mode. Instead of $D_{f\_n}$, $D_{r\_n2}$ can be stored in a recording medium, such as a hard disk drive or a memory at step S600. Then, the flow proceeds from step S600 back to step S100. The flow may also return to step S100 without performing step S600, e.g., after a specified period of time following step S500.

At step S400, when the difference between $D_{r\_n2}$ and $D_{r\_n1}$ is greater than the specified threshold ("NO" in step S400), the flow proceeds to step S700. At step S700, "1" is added to n. At step S800, n is compared to m. When n is equal to or greater than m ("YES" in step S800), the flow proceeds to step S900 to read out the $D_{f\_n}$ as the image data. After step S900, the $D_{f\_n}$ may be read out repeatedly during the prescribed period, as necessary.

When n is less than m ("NO" in step S800), the flow goes back to step S100.

Within a prescribed period, the unit 100 in FIG. 1 can decide which sampling mode is suitable, and the image of the object every period can be formed based on the image data obtained by the specified sampling mode. In FIG. 4, to display the image of the object at the time of (a+1)/b, the result of the $1^{st}$, $2^{nd}$, and $3^{rd}$ sampling modes 2015, 2023, and 2032, which are obtained just before or at the time of (a+1)/b, can be used. According to the embodiment, based on the status of the object, the sampling mode can be changed.

Figure 6:
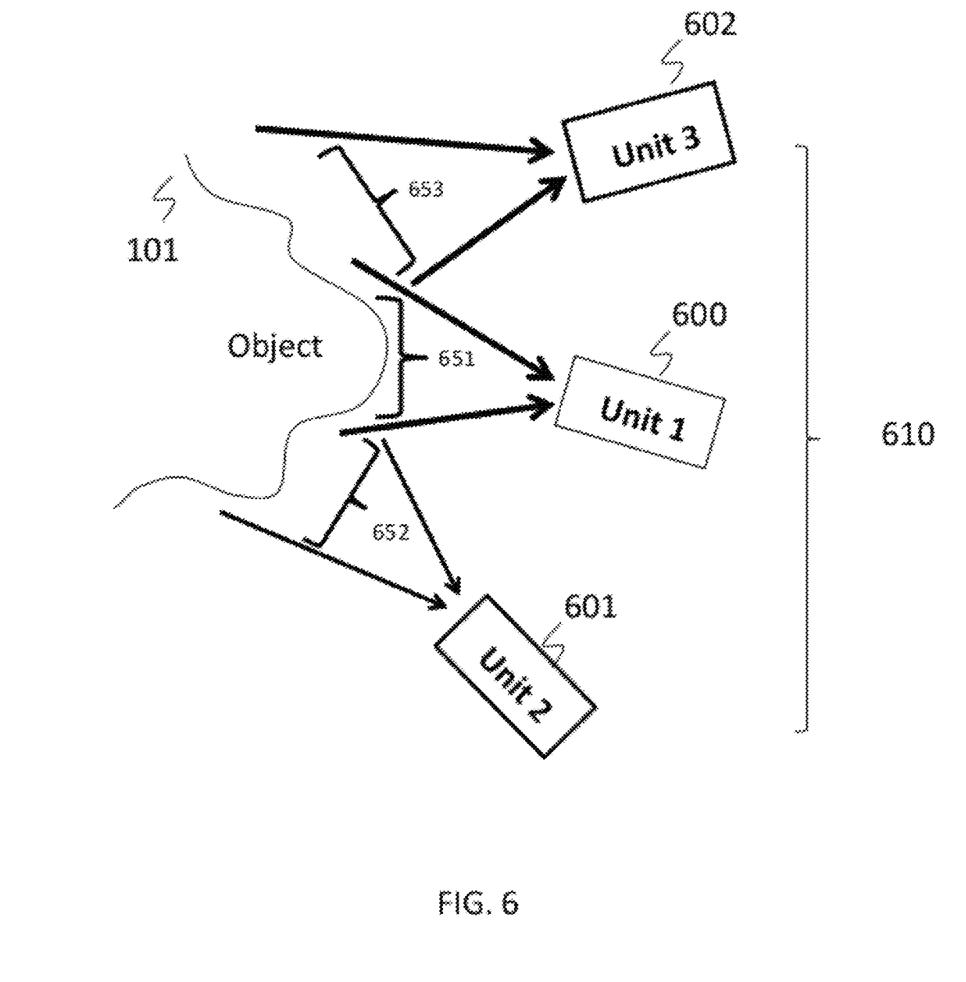
FIG. 6 illustrates a system including three units.

As illustrated in FIG. 6, each of the units 1, 2, and 3 (600, 601, 602) can have the unit 100 illustrated in FIG. 1, and the image of the object 101 by each unit 600, 601, 602 can be different from each other. The covering areas (651, 652, and 653) which can be detected by each unit can be overlapped. Since the angle of each unit to the object can be different, the synthesized image obtained by several units might be wider than the previous one camera system. A three dimensional image can be formed by using the system 610 including the three units 600, 601, 602.

Example 1

Figure 7A:
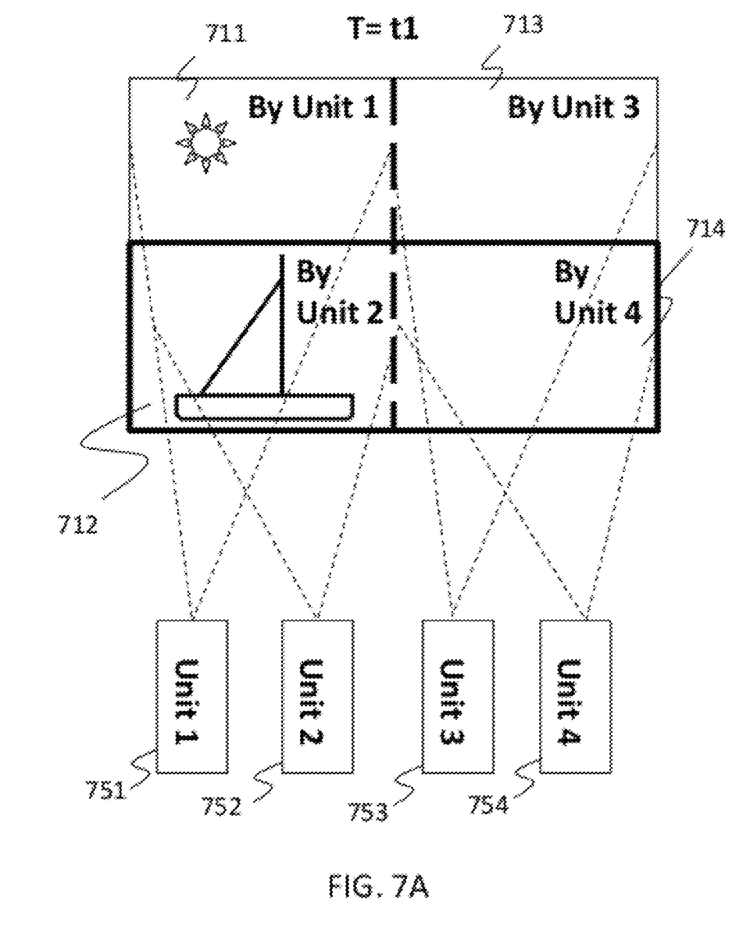
FIG. 7A illustrates a synthesized image including four image portions.
Figure 7B:
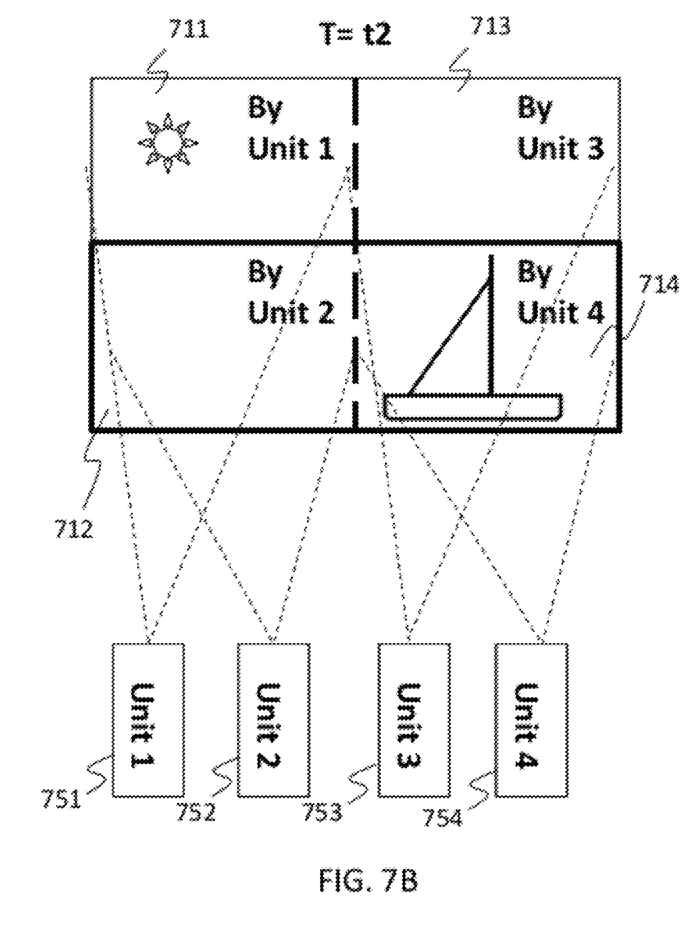
FIG. 7B illustrates a synthesized image including four image portions.

One synthesized image can be formed by four images as illustrated in FIGS. 7A and 7B. Each of the four images can be detected by using four units which have the system 100 illustrated in FIG. 1 and described above. For example, the four units can be included in one imaging apparatus, or each unit can be included in each imaging apparatus.

FIGS. 7A and 7B are the images at the time of t1 and t2, respectively. The image can be composed of the four image portions 711, 712, 713, and 714, which are formed by using the unit 1 (751), unit 2 (752), unit 3 (753), and unit 4 (754), respectively. The image portion 711 at t1 and t2 has an image of a sun with a high spatial frequency, and the image portion 713 doesn't have an image with a high spatial frequency. The image portion 712 has a yacht with a high spatial frequency at T=t1, but doesn't have it at T=t2. The image portion 714 doesn't have the yacht at T=t1 in FIG. 7A, but has it at T=t2 in FIG. 7B.

Figure 8:
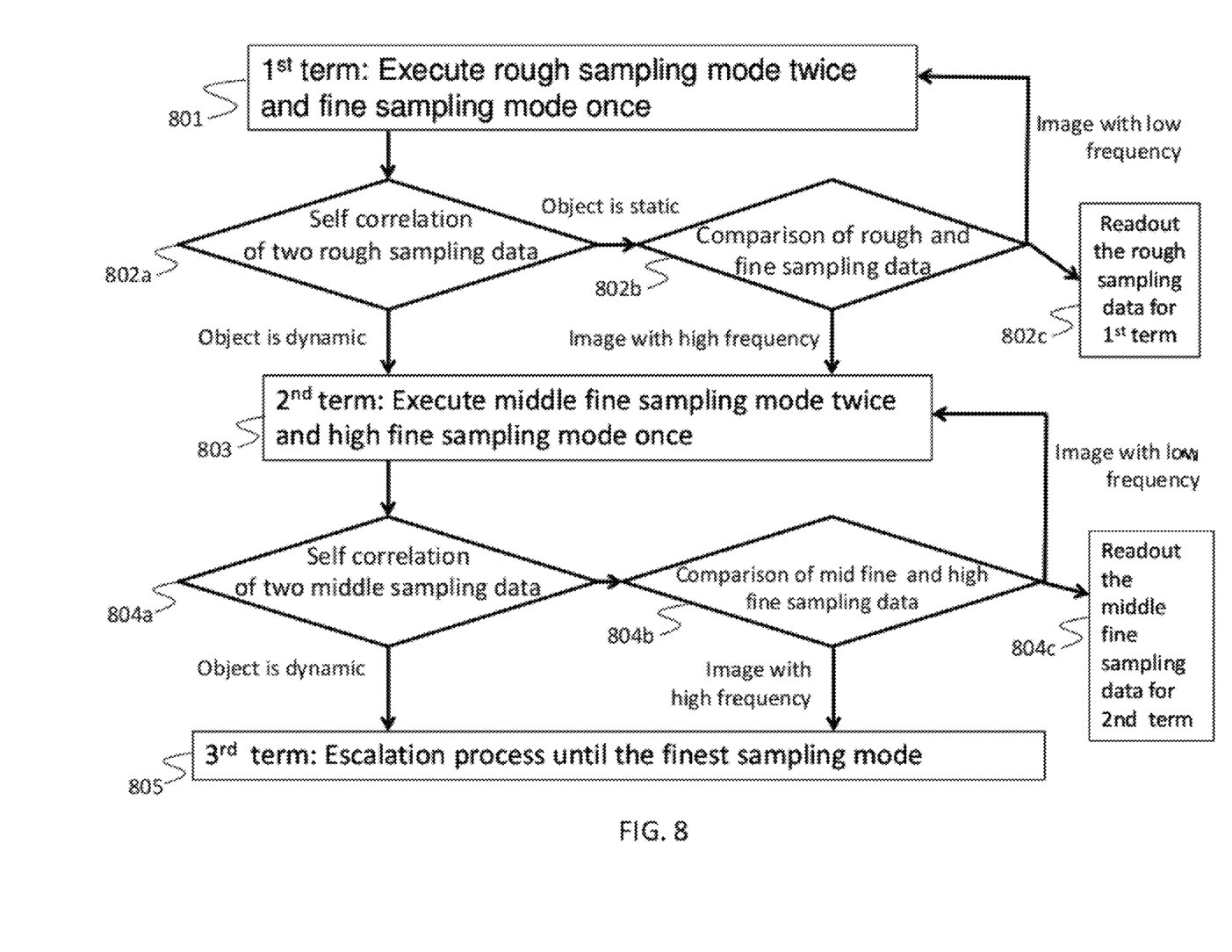
FIG. 8 illustrates a flowchart used for changing the sampling mode.

Within a prescribed period, one or more sampling mode can be executed. In FIG. 8, as illustrated at step 801, rough sampling mode can be executed twice, and fine sampling mode can be executed once in $1^{st}$ term, for every unit.

At step 802$a$, two data obtained by the rough sampling mode can be compared with each other. If there is a substantial difference between the two data, it means the object is dynamic, and the flow proceeds to step 803. When there is no difference between the two data or the difference is less than a prescribed threshold, it means the object is static, and the flow can proceeds to step 802$b$.

At step 802$b$, two data obtained by the rough sampling mode and the fine sampling mode can be compared with each other. If there is a substantial difference between the two data, it means an image of the object with high spatial frequency, and the flow proceeds to step 803. When there is no difference between the two data or the difference is less than a prescribed threshold, it means the object is in low spatial frequency, and the flow proceeds back to step 801, and the data of the rough sampling mode can be read out for $1^{st}$ term at step 802$c$.

At step 803, a middle fine sampling mode can be executed twice, and a high fine sampling mode can be executed once in $2^{nd}$ term (i.e., a period from the end of the $1^{st}$ term to the start of a $3^{rd}$ term) within the prescribed period.

Then, at step 804$a$, two data obtained by the middle fine sampling mode can be compared with each other. If there is a substantial difference between the two data, it means the object is dynamic, and the flow proceeds to step 805 to execute the further finer sampling mode. When there is no difference between the two data or the difference is less than a prescribed threshold, it means the object is static, and the flow proceeds to step 804$b$.

At step 804$b$, two data obtained by the middle fine sampling mode and the high fine sampling mode can be compared with each other. If there is a substantial difference between the two data, it means the object includes an image with high spatial frequency, and the flow proceeds to step 805. When there is no difference between the two data or the difference is less than a prescribed threshold, it means an image of the object is in low spatial frequency, and the flow proceeds back to step 803, and the data of the middle fine sampling mode can be read out as an image in $2^{nd}$ term at step 804$c$.

At step 805, the further finer sampling modes can be executed, as necessary. At step 805, when there is no further finer sampling mode, the data obtained in the high fine sampling mode can be stored for the $2^{nd}$ term.

Figure 9:
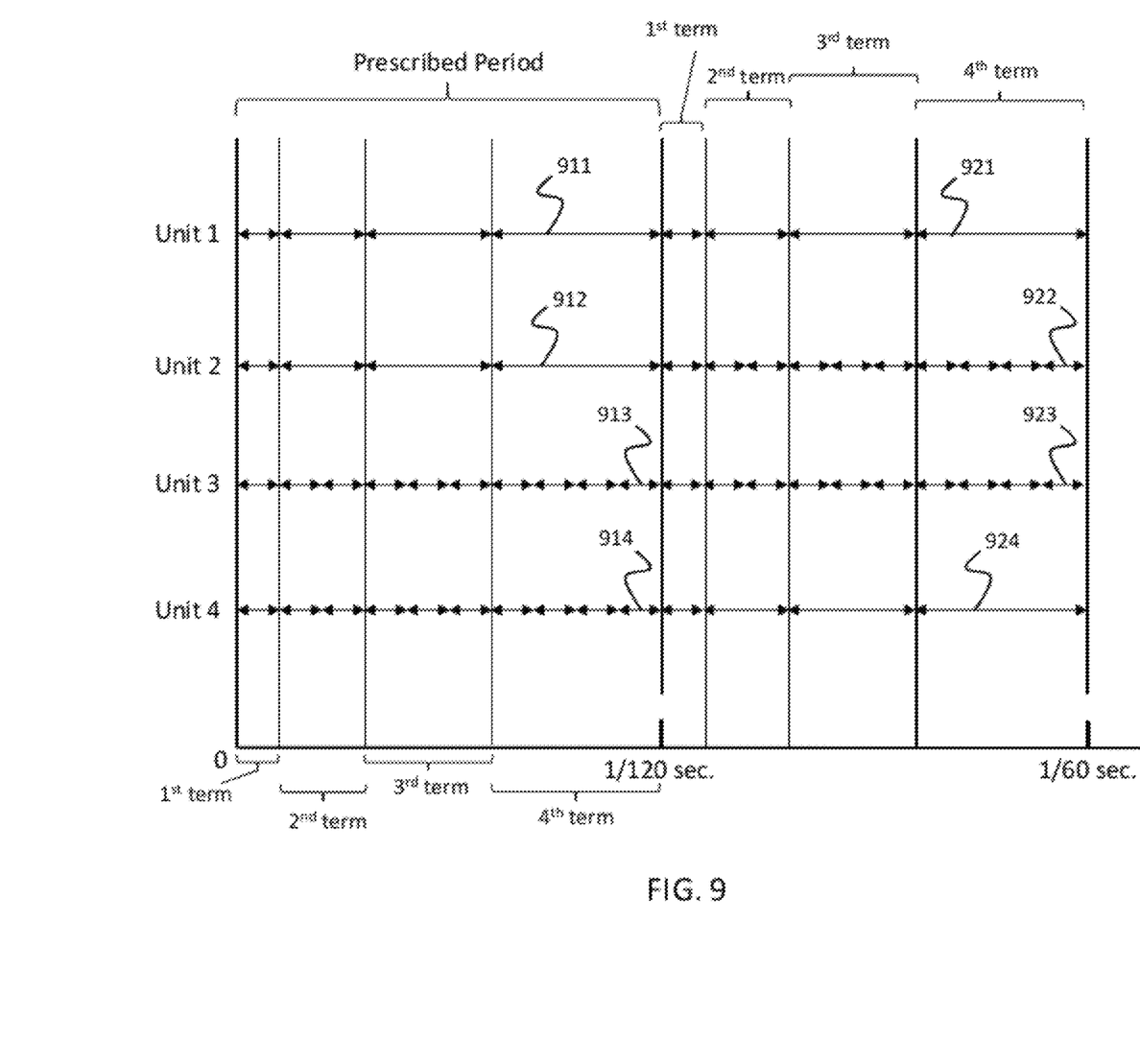
FIG. 9 illustrates changes of the sampling modes.

Since the image portion 711 in FIG. 7A, which is formed by Unit 1, includes an image with high spatial frequency, finer sampling modes are executed in $1^{st}$ term, $2^{nd}$ term, $3^{rd}$ term, and $4^{th}$ term as illustrated in FIG. 9, and the data detected at the term 911 is used to form the image at T=t1. A number of the terms in the prescribed period other than four can be set. As to the portion 711 of the image in FIGS. 7A and 7B, there is no difference between T=t1 and T=t2. The data detected at the term 911 is used to form the image at T=t1. The data detected at the term 921 is used to form the image at T=t2. As illustrated in FIG. 9, during the first prescribed period (0 to 1/120 sec.) and the second prescribed period (1/120 sec. to 1/60 sec.), the sampling frequency for the unit 1 escalates due to the high frequency image.

Since the image portion 712 in FIG. 7A, which is formed by Unit 2, includes a yacht with a high spatial frequency, finer sampling modes are executed from the $1^{st}$ term to the $4^{th}$ term as shown in FIG. 9, and the data detected at the term 912 is used to form the image at T=t1. Since there is not the yacht in the image portion 712 at T=t2, the sampling mode at $1^{st}$ term can be executed continuously, and the data detected at the term 922 is used to form the image at T=t2. As illustrated in FIG. 9, during the first prescribed period (0 to 1/120 sec.), the sampling frequency for the unit 2 escalates due to the dynamic image, and during the second prescribed period (1/120 sec. to 1/60 sec.) the two rough sampling modes and one middle-fine sampling mode continue to be executed for the unit 2, due to the static and low frequency image.

Since the image portion 713 in FIG. 7A, which is formed by Unit 3, doesn't include an image with a high spatial frequency between T=t1 and T=t2, the sampling mode at $1^{st}$ term can be executed continuously, and the data detected at the term 913 and 923 are used to form the image at T=t1, and T=t2, respectively. As illustrated in FIG. 9, during the first prescribed period (0 to 1/120 sec.) and the second prescribed period, the two rough sampling modes and one middle-fine sampling mode continue for the unit 3, due to the static and low frequency image.

Since the image portion 714 in FIG. 7A, which is formed by Unit 4, doesn't include an image with a high spatial frequency at T=t1, the sampling mode at $1^{st}$ term can be executed continuously, and the data detected at the term 914 is used to form the image at T=t1. The image portion 714 in FIG. 7B includes a yacht with a high spatial frequency, finer sampling modes are executed between $1^{st}$ term and $4^{th}$ term as shown in FIG. 9, and the data detected at the term 924 is used to form the image at T=t2. As illustrated in FIG. 9, during the first prescribed period (0 to 1/120 sec.) the two rough sampling modes and one middle-fine sampling mode continue to be executed due to the static and low frequency image, and during the second prescribed period (1/120 sec. to 1/60 sec.), the sampling frequency for the unit 4 escalates due to the dynamic image.

Each unit may play a role to capture an image from a specific angle and a location in a specific wavelength. After getting the image data by each unit, each unit can send the data by wireless signal to a host system which synthesizes one image from the images obtained by the multi-units taking into account of the angle and location of each unit. In order to detect the angle and location of each unit, a global positioning system (GPS) and a compass can be implemented in each unit. Each unit can communicate with each other.

Example 2

Figure 10:
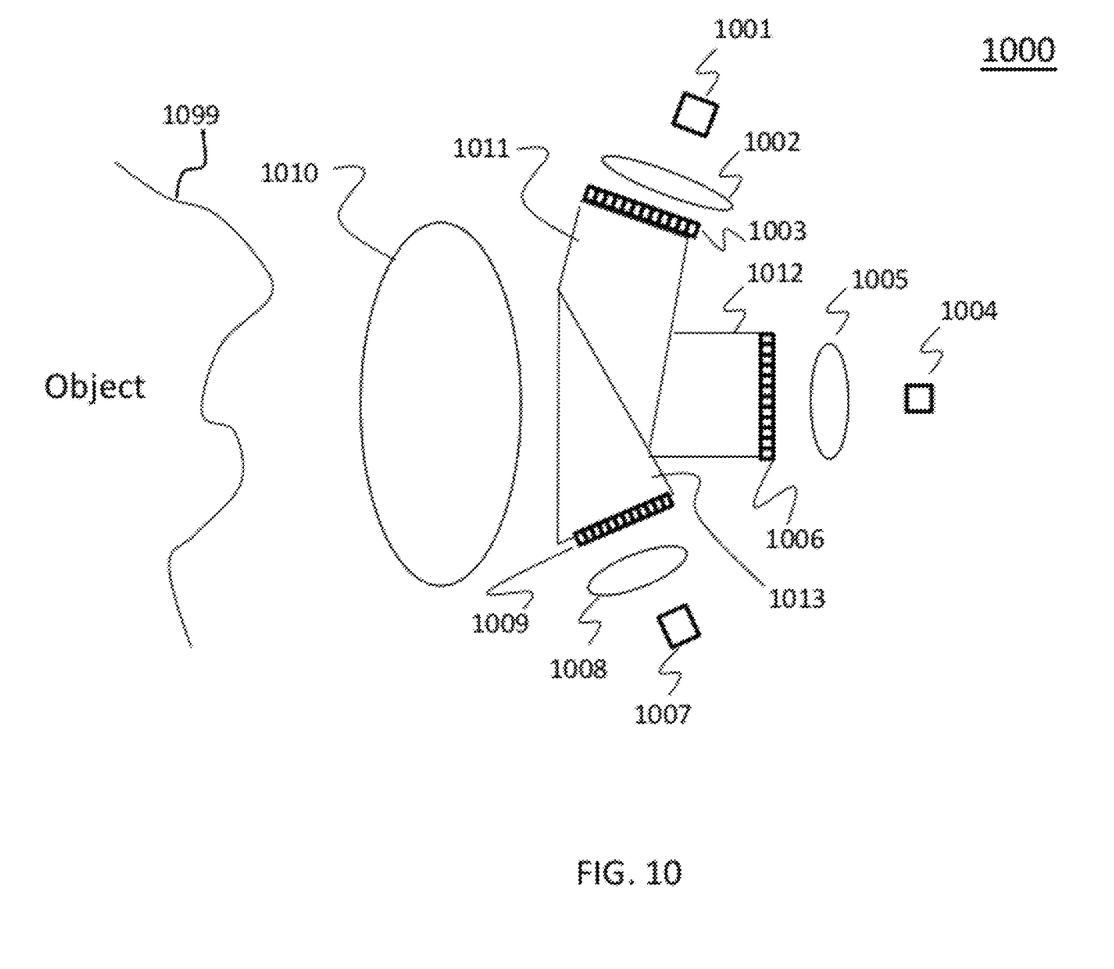
FIG. 10 illustrates a system including three units.

Another system 1000 including three units is illustrated in FIG. 10, and each unit can execute the compressive sampling. This is one of the examples of an integrated system. The photo-detectors 1001, 1004 and 1007 are the detectors for red color, green color, and blue color, respectively. Each detector can be optimized for each color. The focusing lens 1002, 1005 and 1008 are used in the system 1000. The spatial light modulator 1003, 1006 and 1009 are provided for each color, respectively. The references 1011 (for red), 1012 (for green), and 1013 (for blue) are prisms to split into each color. The light from the object 1099 goes through via the image lens 1010, and then each color image can be detected by using compressive sampling technique as described above.

A plurality of the systems 1000, which are placed at different positions and angles from each other, including the three units for each color are used for three dimensional imaging.

Figure 11:
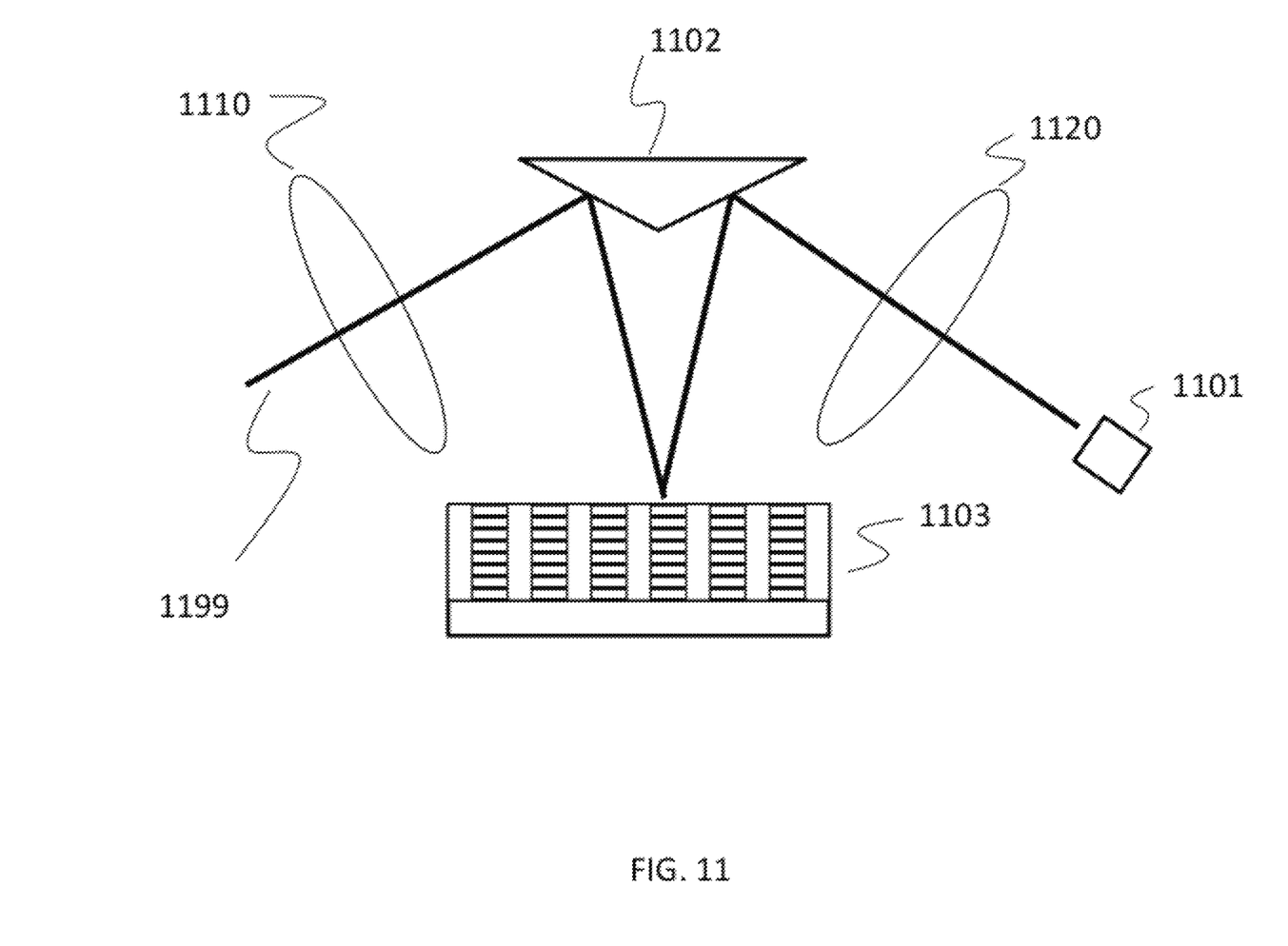
FIG. 11 illustrates a unit using a reflection SLM.

As to the spatial light modulator, in addition to the transmission SLM, a reflection type of SLM can be used as illustrated in FIG. 11. The light 1199 from the object travels via an image lens 1110 to the mirror 1102. And then, the light reflected by the mirror 1102 is led to the reflection SLM 1103, and the light modulated by the reflection SLM 1103 is detected by a photo-detector 1101 via a focusing lens 1102.

While the embodiments according to the present invention have been described with reference to exemplary embodiments, it is to be understood that the present invention is not limited to the above described embodiments. The scope of the following claims is to be accorded the broadest interpretation so as to encompass all such modifications and equivalent structures and functions.

What is claimed is:

1. A method for a compressive sampling, the method comprising:
    driving a spatial light modulator in a first sampling mode which includes rough samplings at least twice by using first coded patterns;
    detecting signals from a photo-detector to obtain first data by using a first rough sampling of the rough samplings;
    detecting signals from the photo-detector to obtain second data by using a second rough sampling of rough samplings; and
    obtaining a first difference between the first data and the second data.

2. The method according to claim 1, wherein the first and the second data are image data reconstructed by using the first coded patterns.

3. The method according to claim 1,
    wherein the first sampling mode includes fine sampling at least once by third coded patterns that are finer than the first coded patterns, and
    further comprising:
        detecting signals from the photo-detector to obtain third data by using the fine sampling and obtaining a second difference between the third data and one of the first data and the second data.

4. The method according to claim 3, further comprising changing the first sampling mode to the second sampling mode which includes rough samplings at least twice by using second coded patterns that are finer than the first coded patterns and fine sampling at least once by using fourth coded patterns that are finer than the third coded patterns, when the first difference is zero or less that a first threshold value and the second difference is greater than a second threshold value.

5. The method according to claim 3, wherein the one of the first data and the second data is stored and the third data is not stored when the first difference is zero or less than a first threshold value and the second difference is zero or less than a second threshold value.

6. The method according to claim 3, further comprising changing the first sampling mode to the second sampling mode which includes rough samplings at least twice by using second coded patterns that are finer than the first coded patterns and fine sampling at least once by using fourth coded patterns that are finer than the third coded patterns, when the second difference is greater than a first threshold value.

7. The method according to claim 3, further comprising changing the first sampling mode to the second sampling mode which includes rough samplings at least twice by using second coded patterns f that are iner than the first coded patterns and fine sampling at least once by using fourth coded patterns that are finer than the third coded patterns, when the second difference is zero or less than a first threshold value and the first difference is greater than a second threshold value.

8. The method according to claim 1, further comprising changing the first sampling mode to a second sampling mode which includes rough samplings at least two times by using second coded patterns that are finer than the first coded patterns, when the first difference is greater than a first threshold value.

9. An apparatus comprising:
    an image lens;
    a spatial light modulator configured to compress sampling;
    a driver unit configured to drive the spatial light modulator in a first sampling mode which includes rough samplings at least twice by using first coded patterns;
    a photo-detector configured to detect signals to obtain first data by using a first rough sampling of the rough samplings and second data by using a second rough sampling of the rough samplings; and
    an image processor configured to obtain
    a first difference between the first data and the second data.

10. The apparatus according to claim 9, wherein the first and the second data are image data reconstructed by using the first coded patterns.

11. The apparatus according to claim 9, wherein the first sampling mode includes fine sampling at least once by third coded patterns that are finer than the first coded patterns,
    wherein the photo-detector detects signals to obtain third data by using the fine sampling, and
    wherein the image processor obtains a second difference between the third data and one of the first data and the second data.

12. The apparatus according to claim 11, wherein the driver unit changes the first fine sampling mode to the second sampling mode which includes rough samplings at least twice by using second coded patterns that are finer than the first coded patterns and fine sampling at least once by using fourth coded patterns that are finer than the third coded patterns when the first difference is zero or less than a first threshold value and the second difference is greater than a second threshold value.

13. The apparatus according to claim 11, wherein the one of the first data and the second data is stored and the third data is not stored when the first difference is zero or less than a first threshold value and the second difference is zero or less than a second threshold value.

14. The apparatus according to claim 9, wherein the driver unit changes the first sampling mode to a second sampling mode which includes rough samplings at least two times by using second coded patterns that are finer than the first coded patterns, when the first difference is greater than a first threshold value.

15. A method for a compressive sampling, comprising:
   driving a spatial light modulator in a first sampling mode which includes rough sampling at least once by using first coded patterns and fine sampling at least once by using second coded patterns that are finer than the first coded patterns;
   detecting signals from a photo-detector to obtain first data by using rough sampling;
   detecting signals from the photo-detector to obtain second data by using fine sampling; and
   obtaining a first difference between the first data and the second data.

16. The method according to claim 15, further comprising changing the first sampling mode to a second sampling mode which includes rough sampling at least once by using third coded patterns that are finer than the first coded patterns and fine sampling at least once by using fourth coded patterns that are finer than the third coded patterns, when the first difference is greater than a first threshold value.

17. The method according to claim 15, wherein the first sampling mode includes rough samplings at least twice by the first coded patterns,
   further comprising detecting signals from the photo-detector to obtain third data by using a first rough sampling of the rough samplings, which is different than the rough sampling used for obtaining the first data, and obtaining a second difference between the second data and one of the first data and the third data.

18. The method according to claim 17, further comprising changing the first sampling mode to the second sampling mode which includes rough samplings at least twice by using third coded patterns that are finer than the first coded patterns and fine sampling at least once by using fourth coded patterns that are finer than the second coded patterns, when the first difference is zero or less than a first threshold value and the second difference is greater than a second threshold value.

19. The method according to claim 17, wherein the one of the first data and the third data is stored and the second data is not stored, when the first difference is zero or less than a first threshold value and the second difference is zero or less than a second threshold value.

\* \* \* \* \*